(12) United States Patent
Gozdawa

(10) Patent No.: US 6,851,862 B2
(45) Date of Patent: Feb. 8, 2005

(54) GAS LUBRICATED THRUST BEARING

(75) Inventor: Richard Julius Gozdawa, Middlesex (GB)

(73) Assignee: Corac Group PLC, Middlesex (GB)

( * ) Notice: Subject to any disclaimer, the term of this patent is extended or adjusted under 35 U.S.C. 154(b) by 30 days.

(21) Appl. No.: 10/250,524

(22) PCT Filed: Jan. 31, 2002

(86) PCT No.: PCT/GB02/00402

§ 371 (c)(1),
(2), (4) Date: Jun. 30, 2003

(87) PCT Pub. No.: WO02/064987

PCT Pub. Date: Aug. 22, 2002

(65) Prior Publication Data

US 2004/0156567 A1 Aug. 12, 2004

(30) Foreign Application Priority Data

Feb. 9, 2001 (GB) .............................................. 0103298

(51) Int. Cl.[7] .............................................. F16C 17/04
(52) U.S. Cl. ....................................... 384/121; 384/448
(58) Field of Search ................................. 384/448, 121, 384/122, 123, 124, 107, 112

(56) References Cited

U.S. PATENT DOCUMENTS

| 4,738,550 A | 4/1988 | Gardner |
| 5,203,438 A | 4/1993 | Ide |
| 5,660,481 A | 8/1997 | Ide |
| 5,947,606 A | 9/1999 | Wanger |

*Primary Examiner*—Lenard A Footland
(74) *Attorney, Agent, or Firm*—Smith-Hill and Bedell

(57) ABSTRACT

A gas lubricated axial thrust bearing for resisting axial forces acting on a machine rotor, comprises at least one pad mounted on a stationary machine surface and axially spaced from a surface of the rotor by a lubricating gas film. The bearing further includes a temperature sensor for sensing the temperature of the pad to provide an output signal indicative of the axial load on the bearing.

13 Claims, 5 Drawing Sheets

GAS LUBRICATED THRUST BEARING

This invention relates to a gas lubricated thrust bearing for a rotary machine and to the control of the axial load on such a thrust bearing. The machine may be a high-speed oil-free compressor or any other rotary machine comprising a rotor acted upon by a thrust force and having a thrust bearing associated with the rotor for resisting the axial thrust force.

During operation of a high-speed oil-free compressor of the general sort disclosed in WO-A-97/28372 (Gozdawa), but with a single impeller stage, the axial thrust force applied to the rotor by the impeller can vary significantly in magnitude as well as in direction according to the compressor operating condition. To provide a thrust bearing strong enough to cope with the peak axial thrust force would require a large cross-section bearing collar to be provided on the rotor. There is, however, a limit to the size of thrust bearing collar which can be provided on the rotor if the collar is to be able to resist the centrifugal forces generated by high-speed rotation of the rotor. In addition, the thrust force capacity of a gas lubricated thrust bearing is a small fraction of the thrust bearing capacity of a liquid lubricated thrust bearing of the same size. Consequently, where gas lubricated thrust bearings are used, it is desirable to be able to control the thrust force or axial load to be resisted by the thrust bearing.

In the case of a liquid lubricated bearing, measurement of the lubricant pressure can be used to estimate the load on the bearing but with air/gas lubricated bearings such an approach cannot be adopted. The invention therefore seeks in its broadest aspect to provide a gas lubricated axial thrust bearing that includes means for generating a signal indicative of the axial load on the bearing so that steps may be taken to avoid exceeding its thrust force capacity.

According to a first aspect of the present invention, there is provided a gas lubricated axial thrust bearing for resisting axial forces acting on a machine rotor, comprising at least one pad mounted on a stationary machine surface and axially spaced from a surface of the rotor by a lubricating gas film, wherein the bearing further includes a temperature sensor for sensing the temperature of the pad to provide an output signal indicative of the axial load on the bearing.

The invention is based on the realisation that as the axial loading on the thrust bearing rises, the spacing between the pad and the rotating surface will decrease and the shearing of the gas film in that spacing will increase. Such shearing is accompanied by frictional losses that raise the temperature of both the pad and the rotor surface.

It is preferred that the rotor be formed with oppositely facing surfaces and that the bearing have pads mounted in close proximity to both surfaces, so that the bearing may resist axial thrust forces acting on the rotor in both directions. Such oppositely facing surfaces may conveniently be the opposite sides of a radially projecting bearing collar on the rotor.

In such a double-acting bearing, at least one pad associated with each of the oppositely facing surfaces is preferably provided with a temperature sensor to enable output signals to be produced indicative of the axial loading on the bearing in both directions.

Advantageously, means are provided for comparing the temperatures of the pads associated with the oppositely facing surfaces of the rotor to evaluate the net axial load acting on the thrust bearing. The temperature of any one pad, in a double-acting thrust bearing, may be affected by parameters other than the axial load. However, these other parameters will affect the two pads equally and any difference in the temperature of the pads acting in opposite directions will be caused only by the difference between the axial thrust forces resisted by the two pads.

Once the axial load on the thrust bearing has been ascertained, it is possible to use the load dependent output signal of the temperature sensor(s) to apply an axial force to the rotor to oppose the load on the bearing, so as to maintain the load within range that the bearing can withstand, that is to say within its thrust force capacity.

In the case of a compressor, the application of an axial force may be achieved by applying a gas pressure to one surface of the impeller. In a preferred embodiment of the invention, a dedicated radially projecting thrust balance collar is provided on the rotor to act as the moving wall or piston of a working chamber to which gas is supplied under pressure to apply an axial force to the rotor. Labyrinth seals may be provided between the rotor and the surrounding stationary machine walls that define the working chamber.

In most rotary machines, the axial thrust forces on the rotor tend only to act in one direction and for that reason it would often suffice to have a single working chamber acting on only one side of the thrust balance collar. It is however possible for the thrust balance collar to have working chambers on its opposite sides to serve as a double-acting piston. In this case, the gas pressure supply to the working chambers can be used to increase and decrease the axial load on the thrust bearing in both direction.

If the machine is or includes a compressor, the gas supply for the working chamber(s) may conveniently be a reservoir that is pressurised by the output of the compressor, thereby avoiding the requirement for any form of auxiliary pump.

According to a second aspect of the present invention there is provided apparatus for providing an indication of the thrust force on a thrust bearing of a rotary machine having a rotor provided with a thrust collar which is arranged to rotate with the rotor, said thrust collar having first and second opposite faces and said thrust bearing comprising at least one bearing pad facing the first face of the collar at a first pad-to-collar interface to resist thrust loading in a first axial direction of the rotor and at least one further bearing pad facing the second face of the collar at a second pad-to-collar interface to resist thrust loading in a second axial direction of the rotor opposite to said first axial direction, said apparatus comprising a first temperature-responsive sensor for providing an output indicative of the temperature at said first interface and a second temperature-responsive sensor to provide an output indicative of the temperature at said second interface.

According to a third aspect of the present invention there is provided a method of obtaining an indication of the thrust force on the thrust bearing of a rotary machine, the thrust bearing comprising bearing pads on opposite sides of a thrust collar of a rotatable rotor of the machine, the method comprising obtaining an indication of a differential in temperature at the pad-to-collar interfaces on the opposite sides of the thrust collar and obtaining therefrom an indication of the direction and magnitude of the thrust loading on the bearing.

The invention will now be described further, by way of example, with reference to the accompanying drawings, in which.

Figure 1:
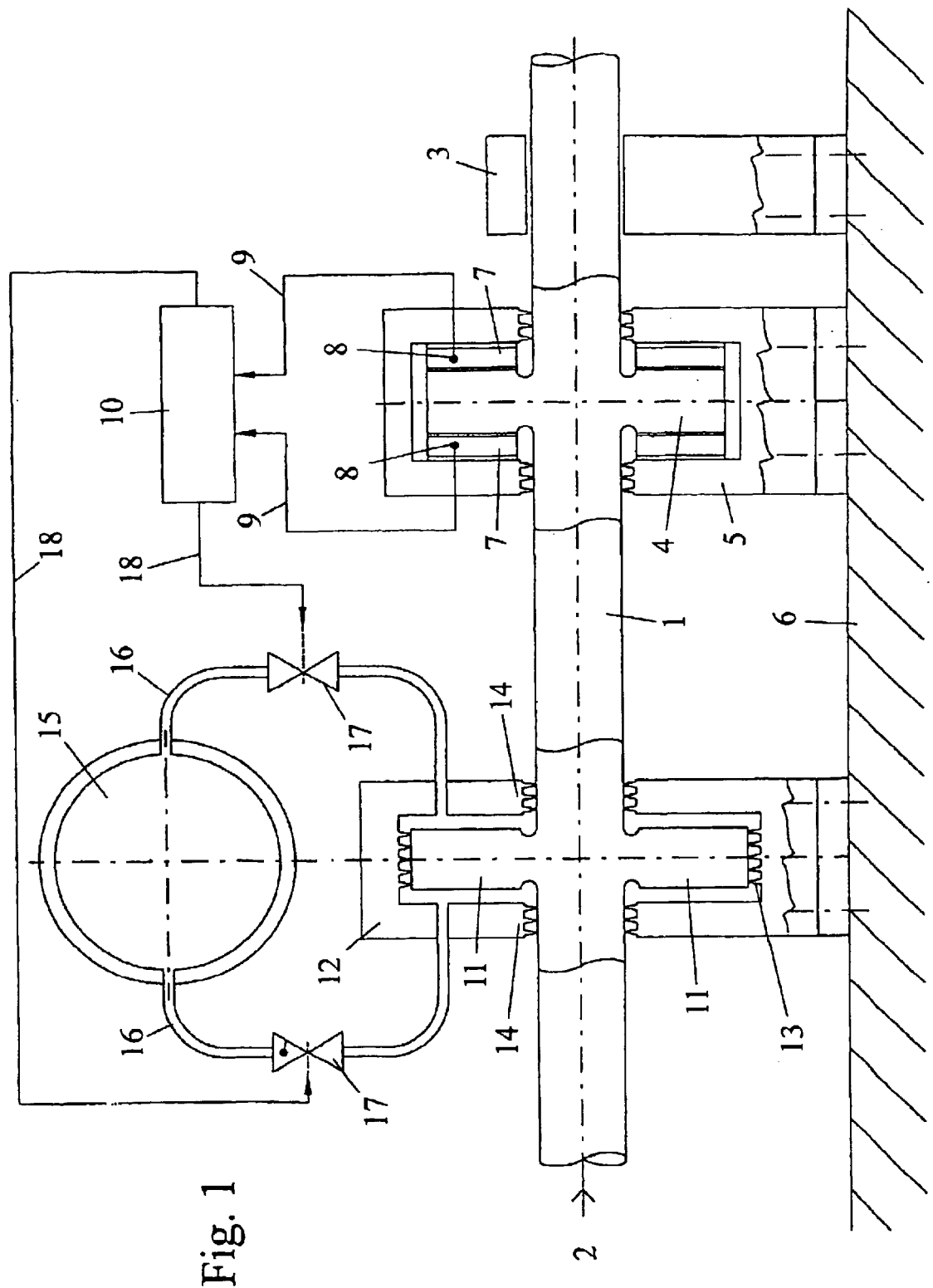
FIG. 1 is a schematic side elevation of a rotary machine incorporating a first embodiment of apparatus in accordance with the present invention.

FIG. 1 is a schematic side elevation of a rotary machine, which machine may for example be a high speed oil-free compressor. Although not shown, an end of the rotor would, in use, be provided with a machine member which, in use of the machine, creates an axial thrust force acting on the rotor 1 in the direction of arrow 2. If, for example, the rotary machine is a high-speed oil-free compressor this machine member (not shown) could take the form of one or more impeller rotor stages, provided on the left-hand end of the rotor 1.

The rotor 1 of the machine is rotatably supported in a plurality of journal bearings 3, of which only one is shown. The journal bearings 3 would normally be retained in the frame of the rotary machine, which frame may include a foundation block.

The rotor 1 carries the collar 4 of a thrust bearing within a thrust bearing housing 5 carried by the machine's frame 6. The collar 4 has first and second opposite, outwardly facing faces. Stationary thrust bearing pads 7 are provided on opposite sides of the bearing collar 4 to resist thrust loading in either of the axial directions of the rotor 1. In the present invention, thrust bearing is gas lubricated. As is well known, in a gas lubricated thrust bearing, gas is provided at high pressure to each thrust collar-to-thrust bearing pad interface to provide a small cushion of high pressure gas to prevent collar-to-bearing pad contact which would be highly undesirable due to the high speed of rotation of the thrust collar 4 relative to the stationary thrust bearing pads 7.

For reasons which will become apparent, temperature responsive sensors 8 are fitted in pockets drilled in the stationary thrust bearing pads 7. These temperature responsive sensors 8 are, for example, ones which provide an electrical output which varies monotonically with temperature, for example thermocouples.

The temperature sensor 8 is positioned as closely as is practicable to the running surface of the pad 7 such that the sensors provide outputs closely indicative of the temperature of the gas at their respective pad-to-collar interfaces. The sensors 8 on opposite sides of the thrust collar 4 are positioned at the same depth in the pads 7.

Outputs 9 from the temperature responsive sensors 8 are transmitted to an electronic controller 10 in the form of a microprocessor. Because the outputs 9 of the temperature responsive sensors 8 on opposite sides of the thrust bearing collar 4 are indicative of the temperatures at their respective collar-to-pad interfaces, the electronic controller 10 is capable of comparing the outputs 9 from the sensors 8 on opposite sides of the thrust collar 4 to obtain an indication of a significant temperature differential between the collar-to-pad interfaces on the opposite sides of the thrust collar 4. When thus, in use of the machine, the machine member (not shown) carried on the rotor 1 creates axial thrust, for example in the direction of arrow 2, and this thrust reaches a level approximately equal to 10% of the total thrust force capacity of the bearing, then the temperature of the gas at the collar-to-pad interface to the right hand (thrust) side of the collar 4 will increase and the temperature at the collar-to-pad interface to the left hand (surge) side of the collar 4 will fall.

The electronic controller 10 is capable of determining the change in balance of the temperature on opposite sides of the thrust collar 4. The direction and magnitude of the imbalance between the outputs 9 from the sensors 8 on opposite sides of the thrust collar 4 enables the electronic controller 10 to determine the direction and magnitude of the thrust loading on the thrust bearing.

The difference between the outputs 9 of the temperature responsive sensors 8 on opposite sides of the thrust collar 4 will not necessarily be zero at zero thrust load, but even if it is not it will be appreciated that changes in the size of the differential will provide a measure of the direction and magnitude of variations in thrust loading.

The rotor 1 is provided with a thrust balance collar 11. This thrust balance collar 11 is separate from the thrust bearing. The collar 11 is situated within a housing defined by a stationary housing member 12. The stationary housing member 12 is fixed rigidly to the frame 6 of the rotary machine. Furthermore, the stationary housing member 12 is provided with seals 13, 14 which seal fluid within the housing member 12 to either side of the thrust balance collar 11, such that gas within the stationary housing member 12 to either side of the thrust balance collar 11 may be raised separately to different pressures at affordable fluid leakage. Outer seal 13 seals between the stationary housing member 12 and the thrust balance collar 11. Inner seals 14 seal between the stationary member 12 and the rotary 1.

Gas, at a pressure higher than ambient, is stored in a gas reservoir 15. Where the rotary machine is a compressor, the gas reservoir 15 may be an accumulator topped up from the machine output. From the following description, it will be apparent that the pressure of gas contained within the gas reservoir 15 can be chosen to suit the specifics of the rotary machine itself.

By controlling the pressure on opposite sides of the thrust balance collar 11, a thrust force can be generated on the thrust balance collar 11 to balance substantially, or in part, the thrust force created by the machine member or members (not shown). In the FIG. 1 embodiment, the indication obtained by the electronic controller 10 concerning the direction and magnitude of the thrust loading on the bearing is used to control the imbalance in the pressure within the stationary housing member 12, on opposite sides of the thrust bearing collar 11, to cause an axial thrust force to act on the rotor 1 via the thrust balance collar 11 to reduce the net axial thrust force on the rotor to be resisted by the thrust bearing.

The gas reservoir 15 is provided with two outlet conduits 16, each connected to a thrust balance chamber on an opposite side of the thrust balance collar 11. Provided in each outlet conduit 16 is a servo valve 17. The servo valves 17 are controllable by outputs 18 from the electronic controller 10.

The pressure of gas to one side of the thrust balance collar 11 is determined principally by the ratio of the flow resistance of that side's servo valve 17 to the flow resistance of the leakage at the seal 14 associated with the same side of the thrust balance collar 11. The same is true of the other side of the thrust balance collar 11.

It will, thus, be appreciated that by utilising the electronic controller 10 to adjust the servo valves 17 a pressure differential can be created across the thrust balance collar 11, which pressure differential in turn creates a thrust on the thrust balance collar 11. It is this created thrust that can be used to oppose the axial thrust applied to the rotor by the machine member or members (not shown), reducing the net axial thrust force on the rotor required to be resisted by the thrust bearing.

The electronic controller 10 is configured to adjust its output 18 so as to control the servo valves 17 to reduce the net axial thrust force on the rotor to be resisted by the thrust bearing to a level that is small and safe, within the thrust force capacity of the bearing.

When there is a pressure differential between the opposite sides of the thrust balance collar 11 within the stationary housing member 12, there will be some leakage through the outer seal 13, but the effect of that leakage can be taken into consideration automatically when the outputs 18 from the electronic controller 10 are such as to bring the differential between the outputs 9 to a satisfactory value. Although both of the outlet conduits 16 are shown as being provided with a servo valve 17, one of these servo valves 17 can be omitted, particularly where the axial thrust force created by the machine member (not shown) will be in one direction only.

Figure 2:
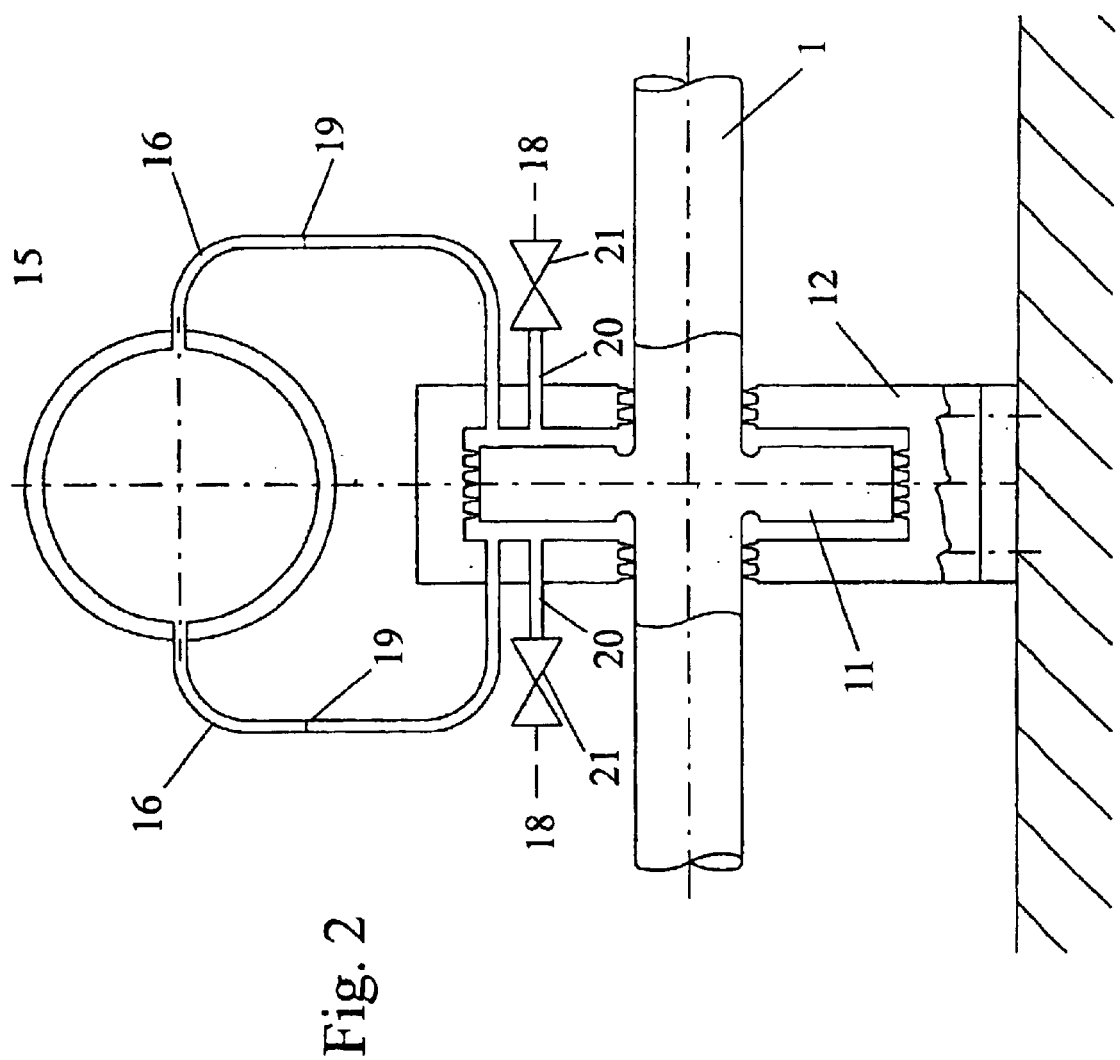
FIG. 2 shows art alternative configuration for the thrust balance chamber and balance chamber pressure controller of the FIG. 1 embodiment.

A further possible modification of the FIG. 1 apparatus is illustrated in FIG. 2. The right hand half of the apparatus illustrated in FIG. 1 would be unchanged, so that only the revised left hand half of the FIG. 1 apparatus has been illustrated in FIG. 2.

In the FIG. 2 modification, instead of the outlet conduits 16 each being provided with a servo valve 17, fixed orifice plates 19 are provided. Furthermore, the thrust balance chambers within the stationary housing member 12, on opposite sides of the thrust balance collar 11, are each provided with a vent 20, the flow through which is controlled by a respective servo valve 21. The servo valves 21 are controlled by the outputs 18 from the electronic controller 10 (not shown in FIG. 2).

It will be appreciated that the pressure drop across a fixed orifice plate 19 will increase as the flow of fluid through it increases. The flow through, and pressure drop across, a fixed orifice plate 19 will thus have its least value when the vent 20 associated with that orifice plate 19 is closed, and will have its greatest value when the vent 20 is fully open. Consequently, by using the servo valves 21 to adjust the degree of opening of the vent 20 to create a pressure differential across the thrust balance collar 11, a thrust force can be generated on the balance collar 11, again to reduce the net axial force on the rotor to be resisted by the thrust bearing (not shown in FIG. 2).

As in the FIG. 1 embodiment, with the FIG. 2 arrangement the outputs 18 from the electronic controller 10 seek to adjust the apparatus in such a way as to reduce the differential between the two outputs 9 to a value that signifies that the net thrust load on the thrust bearing is at a value that is small and safe, i.e. within the capacity of the bearing. This is achieved by transferring some of the thrust load 2 form the thrust bearing to the thrust balance collar 11.

In the machines discussed above in conjunction with FIGS. 1 and 2 the axial thrust force applied to the thrust balance collar is varied in accordance with an operating condition of the rotary machine, in particular the magnitude of the axial thrust force applied to the rotor by the machine member carried by the rotor (for example an impeller stage). The FIGS. 1 and 2 arrangements utilize a form of feedback to keep within limits the amount of axial thrust force on the rotor required to be resisted by the thrust bearing. With a high speed oil-free compressor, for example, the axial thrust force acting on the rotor created by the machine member (e.g. impeller stage or stages) increases significantly as the power output of the machine increases.

Figure 3:
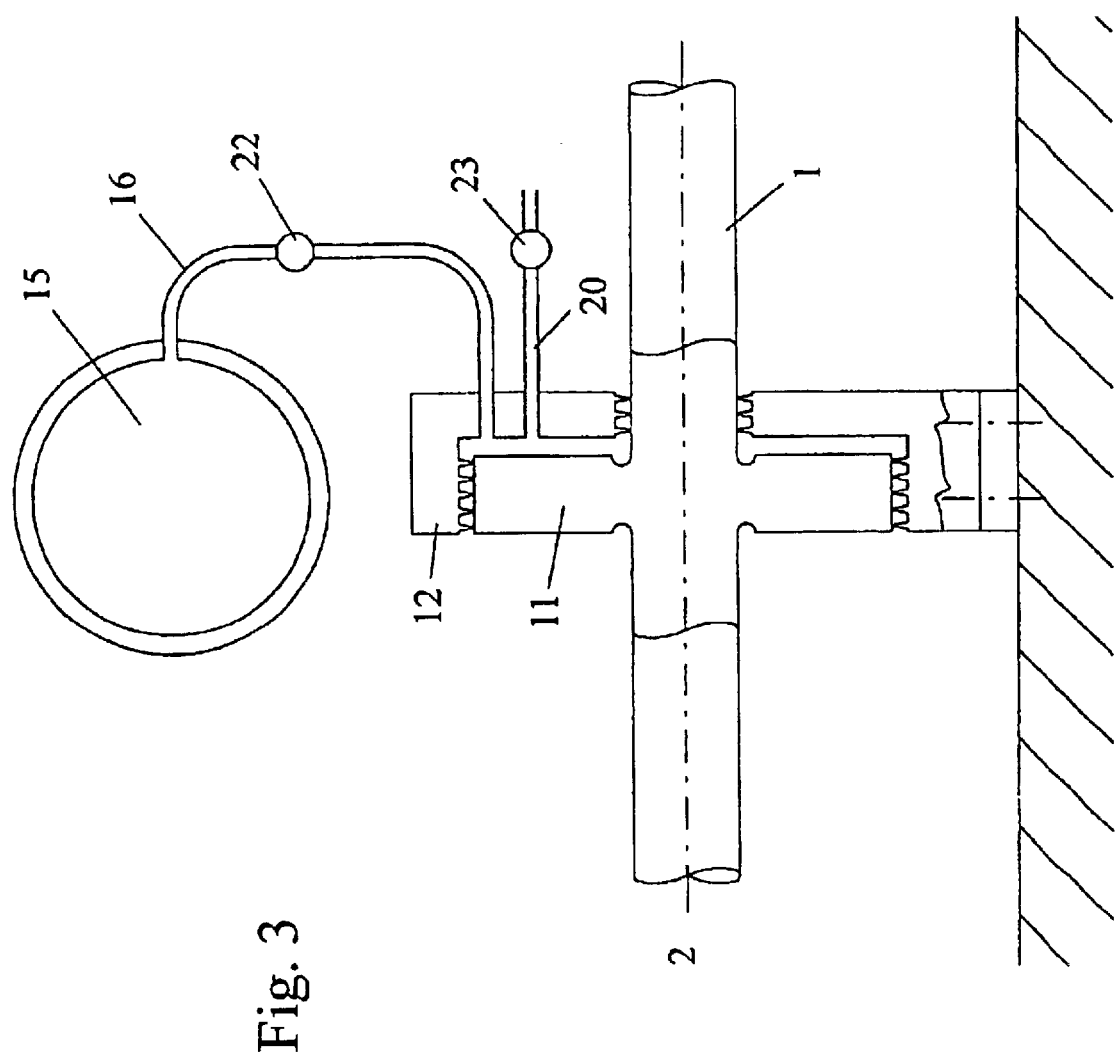
FIG. 3 shows a further alternative configuration for the thrust balance chamber and balance chamber pressure controller of the FIG. 1 embodiment.

The arrangement illustrated in FIG. 3 is a simpler arrangement than the FIGS. 1 and 2 arrangements, in that it is necessary only to apply a pressure to one side of the thrust balance collar 11. As illustrated in FIG. 3, increasing the pressure to the right hand side of the thrust balance collar 11 will apply a thrust force to the thrust balance collar 11 which acts in a direction from right to left (as drawn). If the axial thrust force acting on the rotor created by the machine member (e.g. impeller stage or stages) is always unidirectional, in the case of FIG. 3 from left to right in the direction of arrow 2 as drawn, the simplified arrangement of FIG. 3 will suffice.

In the FIG. 3 arrangement, the item referenced 22 could be a fixed orifice plate in the manner of the fixed orifice plates 19 in FIG. 2 and the item referenced 23 could be a servo valve in the manner of servo valves 21 illustrated in FIG. 2 as controlling venting from a vent 20.

In the above described arrangements the thrust balance collar 11 has taken the form of a collar provided on the rotor 1 separately of both the thrust bearing or bearings and of the member or members which, in use of the machine, Create the axial thrust force to be countered.

Figure 4:
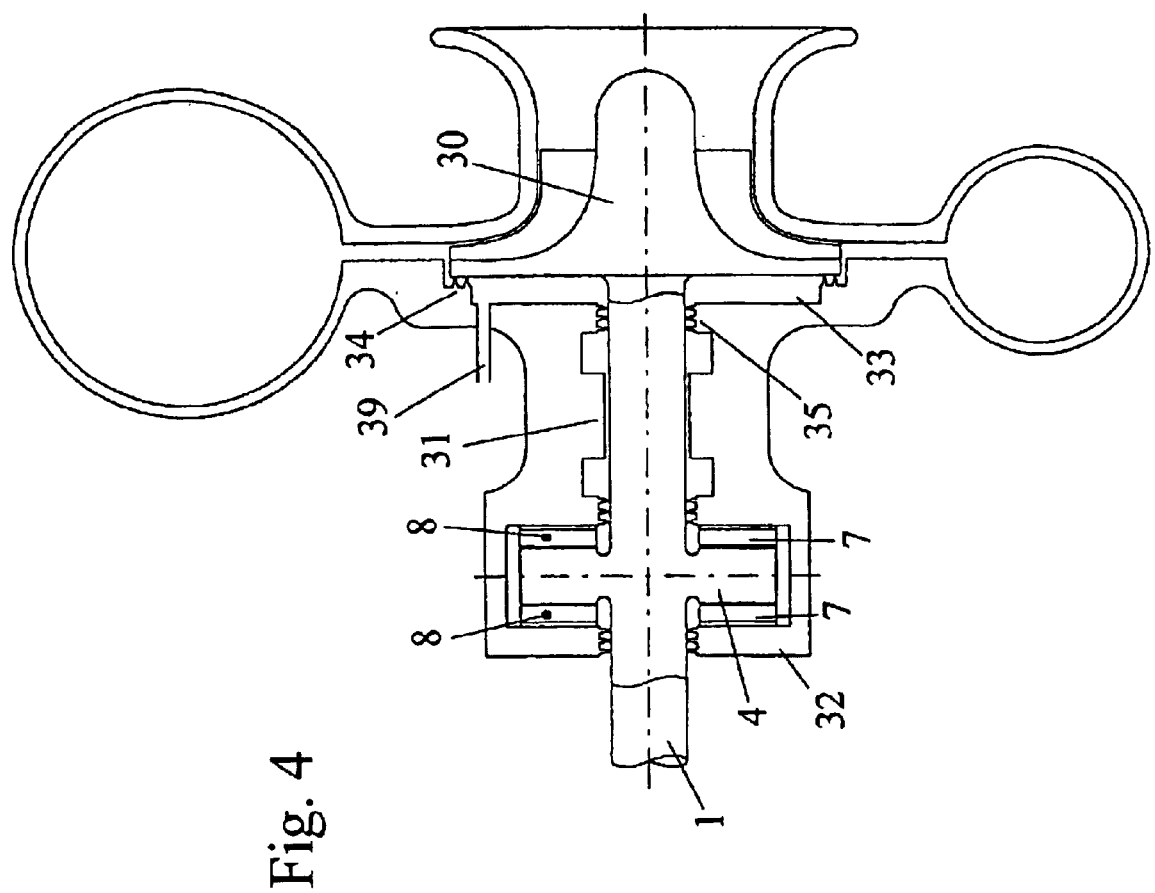
FIG. 4 is a schematic side elevation of part of a high-speed oil-free compressor, incorporating a second embodiment of apparatus in accordance with the present invention.

In the FIG. 4 arrangement the thrust balance member 30 is the machine member which creates the axial thrust force to be countered, in this case an impeller.

In FIG. 4, the thrust balance collar/impeller 30 is provided on one end of the rotor 1 of a centrifugal air/gas compressor. One air/gas lubricated journal bearing 31 is shown. There would be at least one further such bearing (not shown). In addition to housing the journal bearing 31, the compressor casing 32 supports an air/gas lubricated thrust bearing of generally similar construction to those described above, comprising a thrust collar 4 and stationary thrust bearing pads 7 provided with temperature responsive sensors 8 in the form of thermocouples. For simplicity, the rotor drive means (eg. an electric motor) is not shown.

The left hand face of the thrust balance collar/impeller 30 faces, and part defines, a thrust balance chamber 33 part formed by a recess in the compressor casing 32. An outer seal 34 is provided to seal between the compressor casing 32 and the peripheral edge of the left hand surface of the impeller 30. An inner seal 35 is provided to seal between the compressor casing and the rotor 1 adjacent the thrust balance chamber 33.

Figure 5:
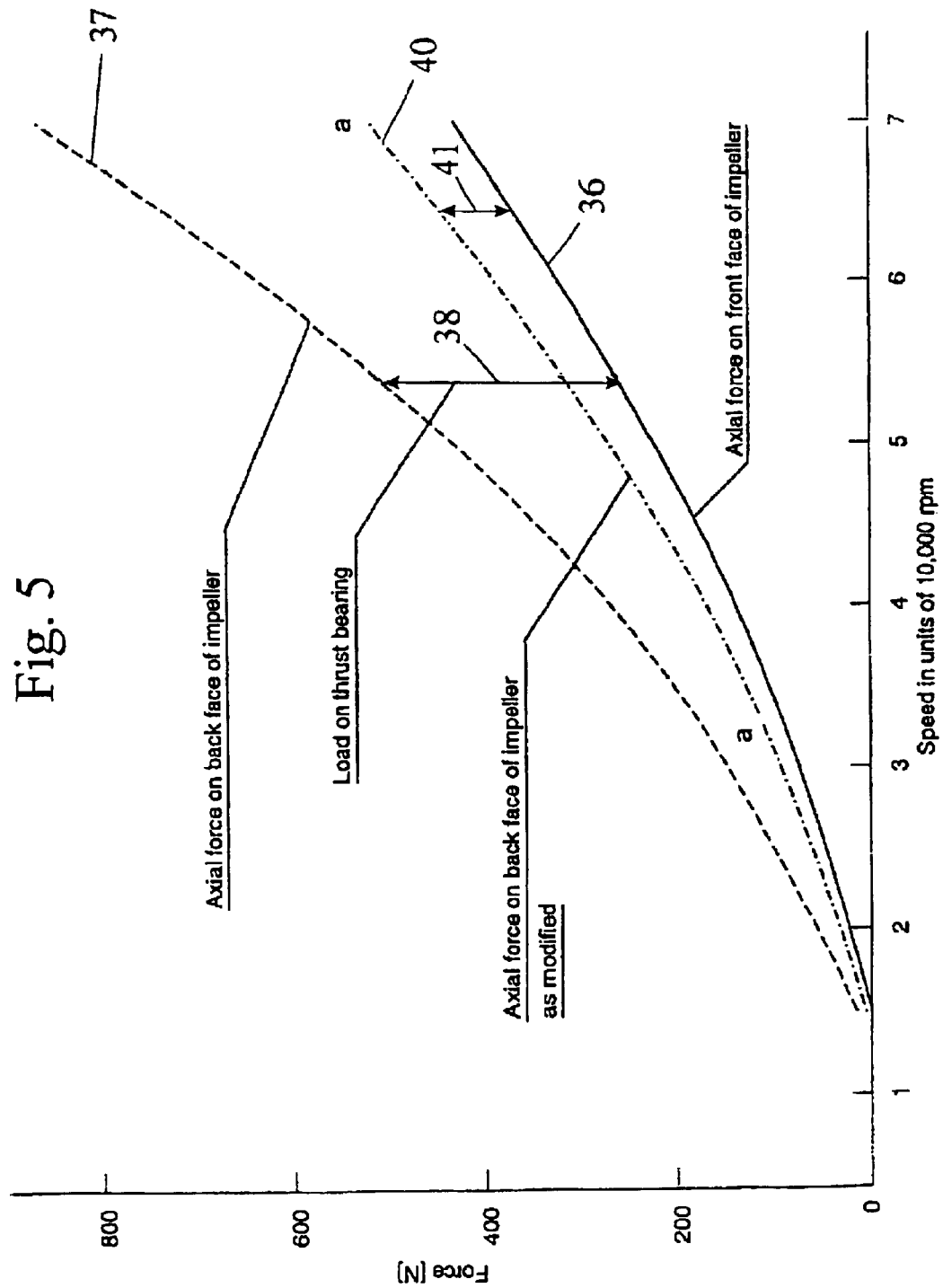
FIG. 5 is a plot of force against machine rotor speed, showing the effect of the embodiment of the invention illustrated in FIG. 4.

Referring to FIG. 5, when the rotary machine is used the pressure acting on the right hand surface of the impeller 30 produces an axial force in the direction from right to left. This will hereinafter be referred to as the axial force on the front face of the impeller and is represented by curve 36 in FIG. 5.

Pressure acting on the left hand surface (back face) of the impeller will produce an opposing axial force, in the direction from left to right. This force will hereinafter be referred to as the axial force on the back face of the impeller and is represented by the curved broken line 37 in FIG. 6.

As can be seen from curve lines 36 and 37 in FIG. 5, neither of these pressures is constant, both increase with rotor speed.

The double-headed arrow referenced 38, in FIG. 5, denotes the net axial force applied to the rotor 1 by the impeller 30. In an arrangement without any thrust bearing load control, this thrust force will all be required to be resisted by the thrust bearing or bearings. Because the curves 36 and 37 diverge at increasing rotor speeds, the net load on the thrust bearing becomes very high at high rotor speeds, i.e. the length of the double-headed arrow 38 will increase.

FIG. 5 represents a somewhat simplistic arrangement in which perfect sealing has been assumed at inner seal 35. In practice there will be leakage at inner seal 35 that will reduce somewhat the pressure acting on the back face of the impeller 30 and thus the axial force on that back face. Nevertheless there will in general at high rotor speeds be a very considerable difference between the opposing axial forces that has to be resisted by the thrust bearing, as exemplified by the length of the double-headed arrow 38 in FIG. 5.

In the FIG. 4 arrangement the axial force on the back face of the impeller is reduced by providing a fixed orifice vent, referenced 39. The size of this vent may be determined by experimentation using information derived from the temperature responsive sensors 8.

The provision of the fixed orifice vent 39 reduces the pressure in the thrust balance chamber 33 in a proportional manner, as illustrated by the chain-dotted curve 40 in FIG. 5, which represents the reduced axial force on the back face of the impeller after the provision of the fixed orifice vent 39. It will be appreciated that, following the provision of fixed orifice vent 39, the curve 40 tracks more closely the shape and magnitude of the curve 36, reducing the net axial thrust force on the rotor to be resisted by the thrust bearing significantly. This net axial thrust force is represented by the double-headed arrow 41.

In a modification of the FIG. 4 arrangement, the fixed orifice vent 39 could be replaced by a vent and servo valve responsive to the output of an electronic controller that takes its inputs from the outputs of the temperature responsive sensors associated with the thrust bearing pads in the manner described above.

Although in FIG. 4 the impeller is one of a centrifugal compressor, it could alternatively be the impeller of a radially inward flow turbine.

What is claimed is:

1. A gas lubricated axial thrust bearing for resisting axial forces acting on a machine rotor, comprising at least one pad mounted on a stationary machine surface and axially spaced from a surface of the rotor by a lubricating gas film, wherein the bearing further includes a temperature sensor for sensing the temperature of the pad to provide an output signal indicative of the axial load on the bearing.

2. A bearing as claimed in claim 1, wherein the rotor is formed with oppositely facing surfaces and the bearing has pads mounted in close proximity to both surfaces, so that the bearing may resist axial thrust forces acting on the rotor in both directions.

3. A bearing as claimed in claim 2, wherein the oppositely facing surfaces are defined by the opposite sides of a radially projecting collar on the rotor.

4. A bearing claimed in claim 2, wherein at least one pad associated with each of the oppositely facing surfaces is provided with a temperature sensor to enable output signals to be produced indicative of the axial loading on the bearing in both directions.

5. A bearing as claimed in claim 4, wherein means are provided for comparing the temperatures of the pads associated with the oppositely facing surfaces of the rotor to evaluate the net axial load acting on the thrust bearing.

6. Apparatus comprising a gas lubricated axial thrust bearing for resisting axial forces acting on a machine rotor, comprising at least one pad mounted on a stationary machine surface and axially spaced from a surface of the rotor by a lubricating gas film, wherein the bearing further includes a temperature sensor for sensing the temperature of the pad to provide an output signal indicative of the axial load on the bearing and means for applying an auxiliary axial force to the rotor to modify the axial load on the thrust bearing in dependence upon the output signal of the temperature sensor(s) so as to maintain the load with a range that the bearing can withstand.

7. Apparatus as claimed in claim 6, wherein the apparatus is a compressor that includes an impeller, and wherein the means for applying an auxiliary force to the rotor comprise means for applying a gas pressure to one surface of the impeller.

8. Apparatus as claimed in claim 6, wherein a dedicated radially projecting collar is provided on the rotor to act as the moving wall or piston of a working chamber to which gas is supplied under pressure to apply an axial force to the rotor.

9. Apparatus as claimed in claim 8, wherein labyrinth seals are provided between the rotor and stationary machine walls that define the working chamber.

10. Apparatus as claimed in claim 8, wherein a single working chamber is provided to act on only one side of the collar.

11. Apparatus as claimed in claim 8, wherein the piston has working chambers on its opposite sides to serve as a double-acting piston, whereby the gas pressure supply to the working chambers can increase and decrease the axial load on the thrust bearing in both directions.

12. An apparatus for providing an indication of the thrust force on a thrust bearing of a rotary machine having a rotary rotor provided with a thrust collar which is arranged to rotate with the rotor, said thrust collar having first and second opposite faces and said thrust bearing comprising at least one bearing pad facing the first face of the collar at a first pad-to-collar interface to resist thrust loading in a first axial direction of the rotor and at least one further bearing pad facing the second face of the collar at a second pad-to-collar interface to resist thrust loading in a second axial direction of the rotor opposite to said first axial direction, said apparatus comprising a first temperature-responsive sensor for providing an output indicative of the temperature at said first interface and a second temperature-responsive sensor to provide an output indicative of the temperature at said second interface.

13. A method of obtaining an indication of the thrust force on the thrust bearing of a rotary machine, the thrust bearing comprising bearing pads on opposite sides of a thrust collar of a rotatable rotor of the machine, the method comprising obtaining an indication of a differential in temperature at the pad-to-collar interfaces on the opposite sides of the thrust collar and obtaining therefrom an indication of the direction and magnitude of the thrust loading on the bearing.

* * * * *